J. J. CRAWFORD.
VEHICLE SPRING SHACKLE.
APPLICATION FILED MAR. 29, 1919.

1,338,557.

Patented Apr. 27, 1920.

WITNESSES

INVENTOR
JOHN J. CRAWFORD
BY
ATTORNEYS

UNITED STATES PATENT OFFICE.

JOHN J. CRAWFORD, OF NEW YORK, N. Y.

VEHICLE-SPRING SHACKLE.

1,338,557.  Specification of Letters Patent.  Patented Apr. 27, 1920.

Application filed March 29, 1919. Serial No. 285,980.

*To all whom it may concern:*

Be it known that I, JOHN J. CRAWFORD, a citizen of the United States, and a resident of the city of New York, in the county of Richmond and State of New York, have invented a new and Improved Vehicle-Spring Shackle, of which the following is a full, clear, and exact description.

The invention relates to vehicle spring shackles such as shown and described in the Letters Patent of the United States, No. 1,185,378, granted to me May 30, 1916.

The object of the invention is to provide a new and improved vehicle spring shackle more especially designed to connect the eyes of a pair of semi-elliptical leaf spring members with each other and arranged to act as a shock absorber and to guard against breaking of the said spring members. Another object is to absorb the minor vibrations and jolts incident to the vehicle running over rough roadways.

With these and other objects in view, the invention consists of certain novel features of construction as hereinafter shown and described and then specifically pointed out in the claim.

A practical embodiment of the invention is represented in the accompanying drawings forming a part of this specification, in which similar characters of reference indicate corresponding parts in all the views.

Figure 2:
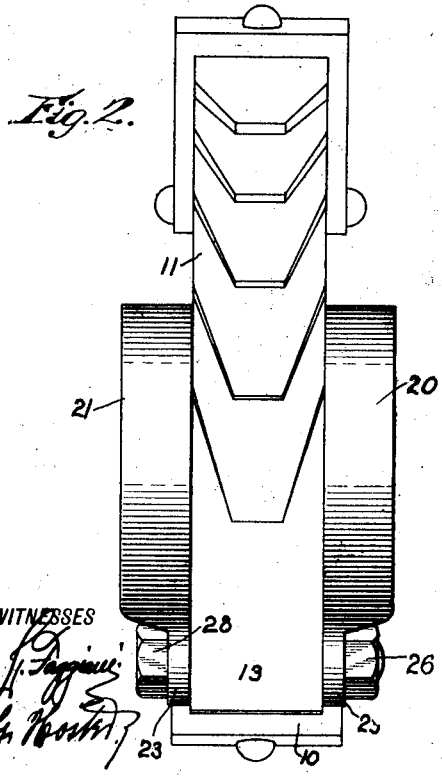
Fig. 2 is a side elevation of the same.
Figure 3:
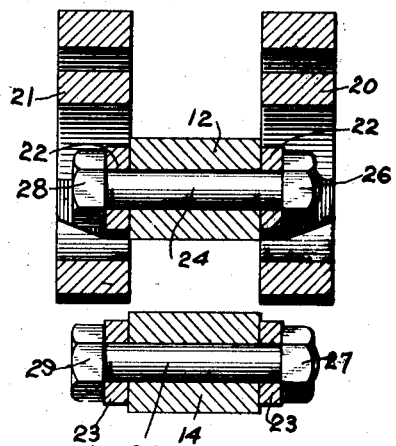
Fig. 3 is a cross section of the same on the line 3—3 of Fig. 1.

The improved vehicle spring shackle is shown applied to the adjacent ends of a pair of semi-elliptical leaf spring members 10 and 11 of usual construction and of which the lower spring member 10 terminates at each end in an eye 12, and the upper spring member 11 terminates at each end in a scroll 13 provided at its end with an eye 14 located a distance below the eye 12. The eyes 12 and 14 are connected with each other by a pair of shackles 20 and 21 each formed of a piece of high grade spring steel bent into a spiral body terminating in inner and outer knuckles 22 and 23 engaged by bolts 24 and 25 extending through the eyes 12 and 14 of the spring members 10 and 11. It is understood that the shackles 20 and 21 are located on opposite sides of the spring members 10 and 11, as plainly indicated in Figs. 2 and 3. The knuckles 22 and 23 are of a thickness less than that of the bodies of which the shackles are made and the inner faces of the knuckles 22 and 23 are flush with the inner faces of the shackle bodies while the outer faces of the knuckles 22 and 23 are spaced from the outer faces of the shackle bodies thus providing sufficient room to accommodate the heads 26, 27 and the nuts 28, 29 of the bolts 24 and 25 within the planes of the outer faces of the shackles 20 and 21, as will be readily understood by reference to Figs. 2 and 3. It will be noticed that by the arrangement described the heads 26, 27 and the nuts 28, 29 of the bolts 24, 25 are protected and do not form undesirable projections on the outer faces of the shackles.

Figure 1:
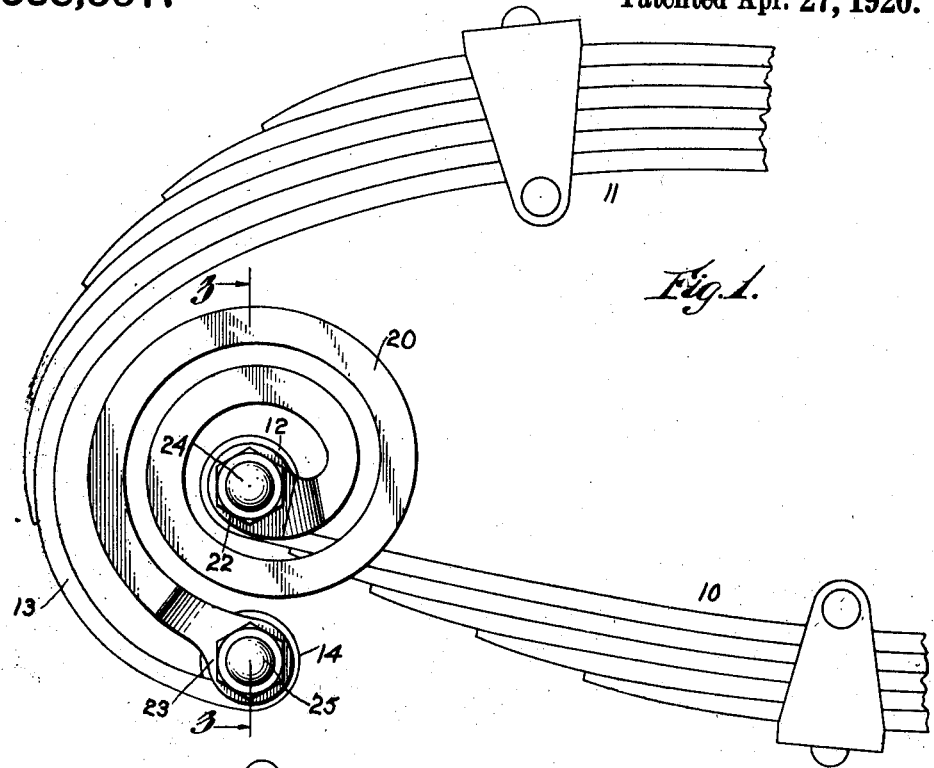
Figure 1 is a face view of the spring shackle as applied to the eyes of a pair of semi-elliptical leaf spring members of an automobile.

In practice the scroll 13 has its center approximately coinciding with the center of the spiral bodies of the spring members 10 and 11. By reference to Fig. 1 it will be noticed that the outer convolutions of the shackles 20 and 21 are spaced from the scroll 13 and are practically concentric therewith to insure a proper coaction of the shackles with the scroll 13 and thereby providing an exceedingly sensitive but strong and durable connection between the eyes 12 and 14 of the spring members 10 and 11.

It will further be noticed that by making the shackle bodies in spiral form a desired resiliency is obtained without the shackle taking up too much room owing to its spiral shape although being formed of a piece of steel of considerable length. By using two shackles at the opposite sides of the spring members 10 and 11 a strong but exceedingly resilient connection is had between the two spring members, and the latter are subjected to uniform pressure throughout their length owing to the location of the shackles on opposite sides.

It is understood that the spring shackle can be readily applied to vehicle spring members 10 and 11 now in use by substituting this shackle for the ordinary one held in place by the same bolts 24 and 25.

Although the spring shackle is shown applied to semi-elliptical leaf springs, it is evident that I do not limit myself to this spring construction as the springs 10 and 11 may represent half, three-quarter or full elliptic springs.

Having thus described my invention, I claim as new and desire to secure by Letters Patent:—

In combination, a pair of upper and lower vehicle springs one of said springs terminating in a scroll curved around the end of the other spring whereby said ends are positioned one above the other, shackles connecting the corresponding ends of the upper and lower springs with each other, each shackle comprising a pair of resilient spiral bodies positioned within the scroll of said scroll spring end with their outer end secured at opposite sides of the ends of the scroll spring end and their convolutions corresponding to the curve of said scroll spring end and then overlying the sides of the other spring end, with their inner ends secured at opposite sides of the end of said last mentioned spring end.

JOHN J. CRAWFORD.